United States Patent
Lee

(10) Patent No.: US 12,010,581 B2
(45) Date of Patent: Jun. 11, 2024

(54) METHOD AND APPARATUS FOR CELL RESELECTION IN WIRELESS COMMUNICATION SYSTEM

(71) Applicant: LG ELECTRONICS INC., Seoul (KR)

(72) Inventor: Oanyong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 421 days.

(21) Appl. No.: 17/413,489

(22) PCT Filed: Jan. 15, 2020

(86) PCT No.: PCT/KR2020/000717
§ 371 (c)(1),
(2) Date: Jun. 11, 2021

(87) PCT Pub. No.: WO2020/149631
PCT Pub. Date: Jul. 23, 2020

(65) Prior Publication Data
US 2022/0070751 A1    Mar. 3, 2022

(30) Foreign Application Priority Data

Jan. 16, 2019  (KR) .................. 10-2019-0005940
Jan. 16, 2019  (KR) .................. 10-2019-0005948

(51) Int. Cl.
*H04W 36/30*  (2009.01)
(52) U.S. Cl.
CPC .................. *H04W 36/30* (2013.01)
(58) Field of Classification Search
CPC .............. H04W 36/30; H04W 36/32
See application file for complete search history.

(56) References Cited

U.S. PATENT DOCUMENTS 8,681,736 B2 * 3/2014 Nader ............... H04W 36/0085
370/332
2010/0278146 A1 * 11/2010 Aoyama ............... H04W 48/20
455/436

(Continued)

FOREIGN PATENT DOCUMENTS

WO    2011141073    11/2011

OTHER PUBLICATIONS

3rd Generation Partnership Project (3GPP), "Technical Specification Group Radio Access Network; NR; User Equipment (UE) procedures in Idle mode and RRC Inactive state (Release 15)," 3GPP TS 38.304 V15.1.0, Sep. 2018, 27 pages.

(Continued)

*Primary Examiner* — Gregory B Sefcheck
(74) *Attorney, Agent, or Firm* — LEE, HONG, DEGERMAN, KANG & WAIMEY

(57) ABSTRACT

The present disclosure relates to cell reselection in wireless communications. According to an embodiment of the present disclosure, a method performed by a wireless device in a wireless communication system comprises: performing a cell reselection to a cell; receiving information for a signal quality range, information for a scaling factor for the signal quality range and information for a time period for determining a number of cell reselections; based on a determination that a signal quality measured for the cell is within the signal quality range, applying the scaling factor for the signal quality range to the time period; and estimating a mobility state of the wireless device based on the time period to which the scaling factor is applied.

9 Claims, 16 Drawing Sheets

(56) References Cited

U.S. PATENT DOCUMENTS

| | | | | |
|---|---|---|---|---|
| 2010/0298001 | A1* | 11/2010 | Dimou | G01S 11/08 455/441 |
| 2012/0026972 | A1* | 2/2012 | Miao | H04W 36/0072 370/331 |
| 2013/0182583 | A1* | 7/2013 | Siomina | H04W 24/00 370/252 |
| 2013/0225182 | A1* | 8/2013 | Singh | H04W 36/32 455/444 |
| 2013/0244664 | A1* | 9/2013 | Song | H04W 36/32 455/437 |
| 2014/0274063 | A1* | 9/2014 | Singh | H04W 36/36 455/437 |
| 2014/0357273 | A1* | 12/2014 | Teng | H04W 8/02 455/436 |
| 2015/0072706 | A1* | 3/2015 | Michaelsen | H04W 64/006 455/456.1 |
| 2015/0094102 | A1* | 4/2015 | Jung | H04W 24/10 455/456.6 |
| 2015/0195716 | A1* | 7/2015 | Worrall | H04W 24/08 455/67.7 |
| 2015/0208301 | A1* | 7/2015 | Ueda | H04W 36/00835 455/444 |
| 2015/0264622 | A1* | 9/2015 | Ueda | H04W 36/32 455/438 |
| 2016/0119834 | A1* | 4/2016 | Yang | H04W 36/24 455/436 |
| 2018/0146410 | A1* | 5/2018 | Cho | H04W 72/23 |
| 2020/0008043 | A1* | 1/2020 | Kim | H04W 76/27 |
| 2020/0112895 | A1* | 4/2020 | Tang | H04W 36/0072 |
| 2020/0351733 | A1* | 11/2020 | Tao | H04W 76/27 |
| 2020/0359193 | A1* | 11/2020 | Tang | H04W 76/27 |
| 2021/0076290 | A1* | 3/2021 | Hong | H04W 48/12 |
| 2021/0400589 | A1* | 12/2021 | Yiu | H04W 52/0254 |

OTHER PUBLICATIONS

CMCC, "Mobility state detection for UE in NR," 3GPP TSG-RAN WG2 NR Ad hoc 1801, R2-1800800, Jan. 2018, 2 pages.

Samsung, "Discussion on Speed-dependent Scaling of Measurement-related Parameters and Mobility History Reporting," 3GPP TSG-RAN2#101bis, R2-1806058, Apr. 2018, 3 pages.

Huawei et al., "Speed dependent mobility in Idle and Inactive mode," 3GPP TSG-RAN2 Meeting #102, R2-1808207, May 2018, 3 pages.

3rd Generation Partnership Project (3GPP), "Technical Specification Group Radio Access Network; Evolved Universal Terrestrial Radio Access (E-UTRA); User Equipment (UE) procedures in idle mode (Release 15)," 3GPP TS 36.304 V15.2.0, Dec. 2018, 55 pages.

PCT International Application No. PCT/KR2020/000717, International Search Report dated Apr. 28, 2020, 2 pages.

* cited by examiner

METHOD AND APPARATUS FOR CELL RESELECTION IN WIRELESS COMMUNICATION SYSTEM

CROSS-REFERENCE TO RELATED APPLICATIONS

This application is the National Stage filing under 35 U.S.C. 371 of International Application No. PCT/KR2020/000717, filed on Jan. 15, 2020, which claims the benefit of earlier filing date and right of priority to Korean Application Nos. 10-2019-0005948, filed on Jan. 16, 2019 and 10-2019-0005940, filed on Jan. 16, 2019, the contents of which are all incorporated by reference herein in their entirety.

BACKGROUND OF THE DISCLOSURE

Field of the Disclosure

The present disclosure relates to cell reselection in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A wireless device such as a user equipment (UE) in a wireless communication system may have a mobility and may move along a various cells. If a current cell on which the wireless device camped cannot provide a proper service to the wireless device as the wireless device moves, the wireless device may have to perform a cell reselection to another cell.

SUMMARY OF THE DISCLOSURE

Technical Problem

An aspect of the present disclosure is to provide method and apparatus for cell reselection in a wireless communication system.

Another aspect of the present disclosure is to provide method and apparatus for a mobility state estimation (MSE) in a wireless communication system.

Another aspect of the present disclosure is to provide method and apparatus for cell reselection counting in a wireless communication system.

Another aspect of the present disclosure is to provide method and apparatus for estimating a mobility state of a wireless device based on the cell reselection counting in a wireless communication system.

Another aspect of the present disclosure is to provide method and apparatus for performing a cell reselection based on the MSE in a wireless communication system.

Technical Solution

According to an embodiment of the present disclosure, a method performed by a wireless device in a wireless communication system comprises: performing a cell reselection to a cell; receiving information for a signal quality range, information for a scaling factor for the signal quality range and information for a time period for determining a number of cell reselections; based on a determination that a signal quality measured for the cell is within the signal quality range, applying the scaling factor for the signal quality range to the time period; and estimating a mobility state of the wireless device based on the time period to which the scaling factor is applied.

According to an embodiment of the present disclosure, a wireless device in a wireless communication system comprises: a transceiver; a memory; and at least one processor operatively coupled to the transceiver and the memory, and configured to: perform a cell reselection to a cell, control the transceiver to receive information for a signal quality range, information for a scaling factor for the signal quality range and information for a time period for determining a number of cell reselections, based on a determination that a signal quality measured for the cell is within the signal quality range, apply the scaling factor for the signal quality range to the time period, and estimate a mobility state of the wireless device based on the time period to which the scaling factor is applied.

According to an embodiment of the present disclosure, a processor for a wireless device in a wireless communication system is configured to control the wireless device to perform operations comprising: performing a cell reselection to a cell; receiving information for a signal quality range, information for a scaling factor for the signal quality range and information for a time period for determining a number of cell reselections; based on a determination that a signal quality measured for the cell is within the signal quality range, applying the scaling factor for the signal quality range to the time period; and estimating a mobility state of the wireless device based on the time period to which the scaling factor is applied.

According to an embodiment of the present disclosure, a computer-readable medium having recorded thereon a program for performing each step of a method on a computer is provided. The method comprises: performing a cell reselection to a cell; receiving information for a signal quality range, information for a scaling factor for the signal quality range and information for a time period for determining a number of cell reselections; based on a determination that a signal quality measured for the cell is within the signal quality range, applying the scaling factor for the signal quality range to the time period; and estimating a mobility state of the wireless device based on the time period to which the scaling factor is applied.

Advantageous Effect

The present disclosure can have various advantageous effects.

For example, by extending a cell reselection counting period based on whether a wireless device passes through a center of a cell coverage or a boundary of the cell coverage (or, based on a channel quality for the cell), the wireless device can maintain the number of cell reselections counted for MSE longer and thus can stay in an appropriate mobility state. Therefore, better cell reselection performance can be expected for the wireless device based on the appropriate mobility state which may correspond to an actual mobility behavior (e.g., speed) of the wireless device.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
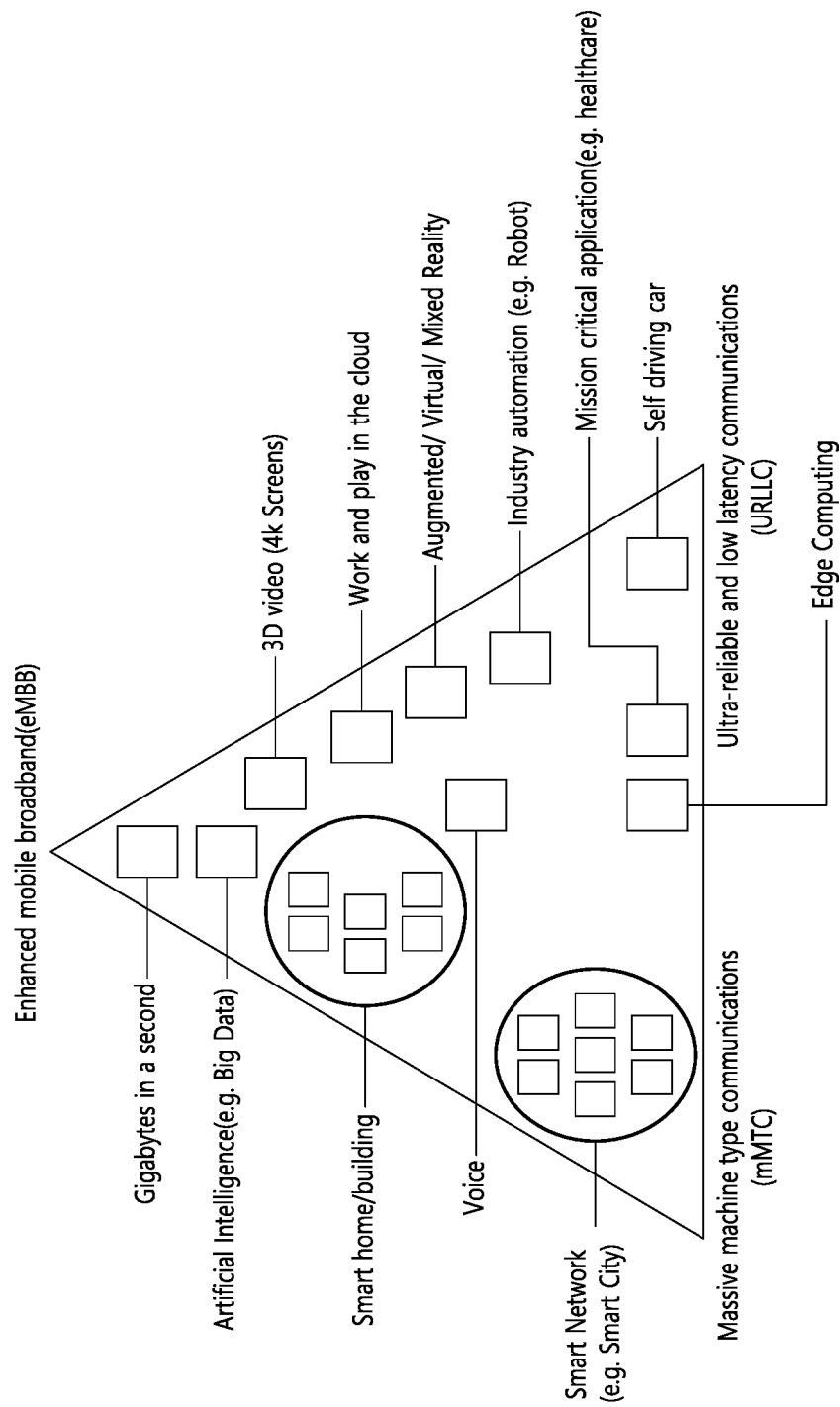
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Cell reselection time' refers to a time and/or a time point in which cell reselection is performed.

'Signal quality range' refers to a range of a signal quality from a lower bound of the signal quality range to an upper bound of the signal quality range. Signal quality range A may be considered higher than signal quality range B if lower bound of the signal quality range A is higher than upper bound of the signal quality range B. Similarly, signal quality range A may be considered lower than signal quality range B if an upper bound of the signal quality range A is lower than a lower bound of the signal quality range B.

'Cell reselection counting period' refers to a time period for determining/counting the number of cell reselections. The cell reselection counting period may also be referred to as a time period or duration for evaluating allowed amount of cell reselections. An example of the cell reselection counting period is $T_{CRmax}$ described later.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
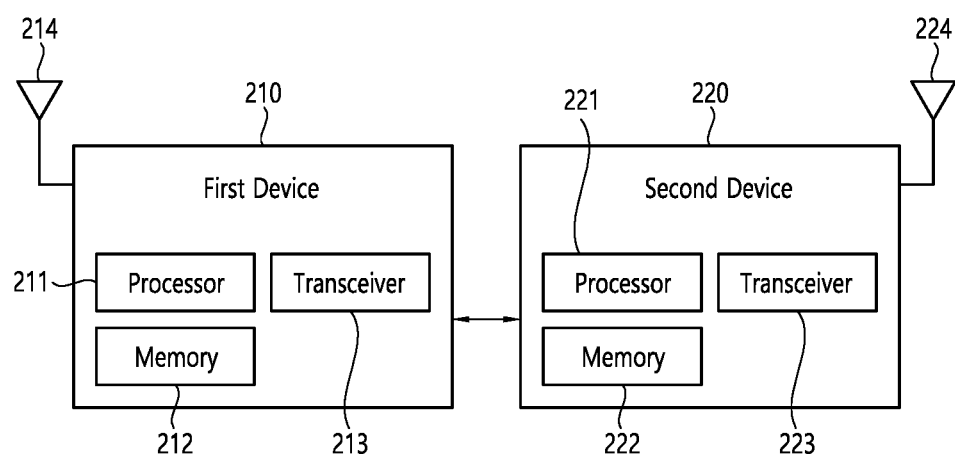
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
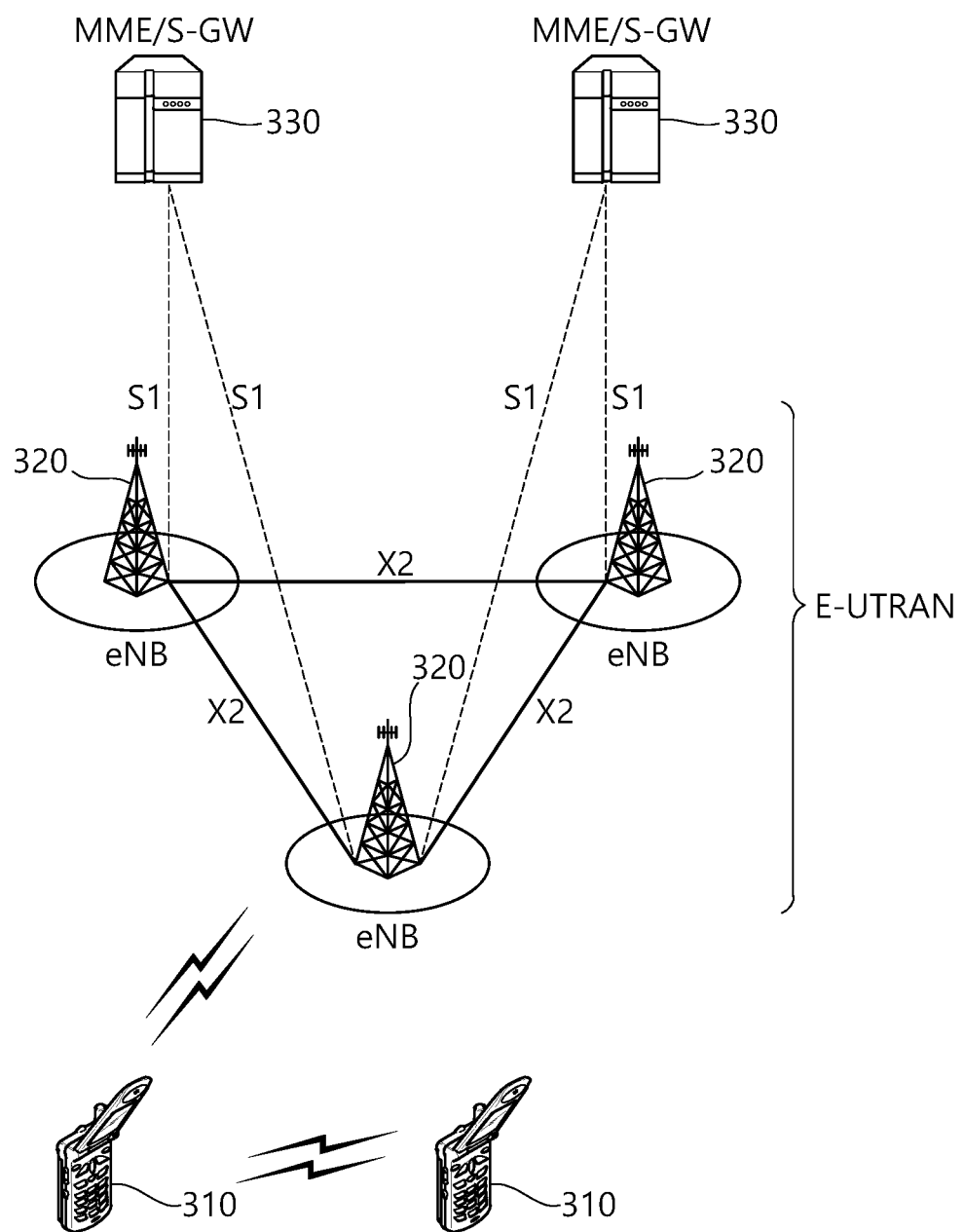
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
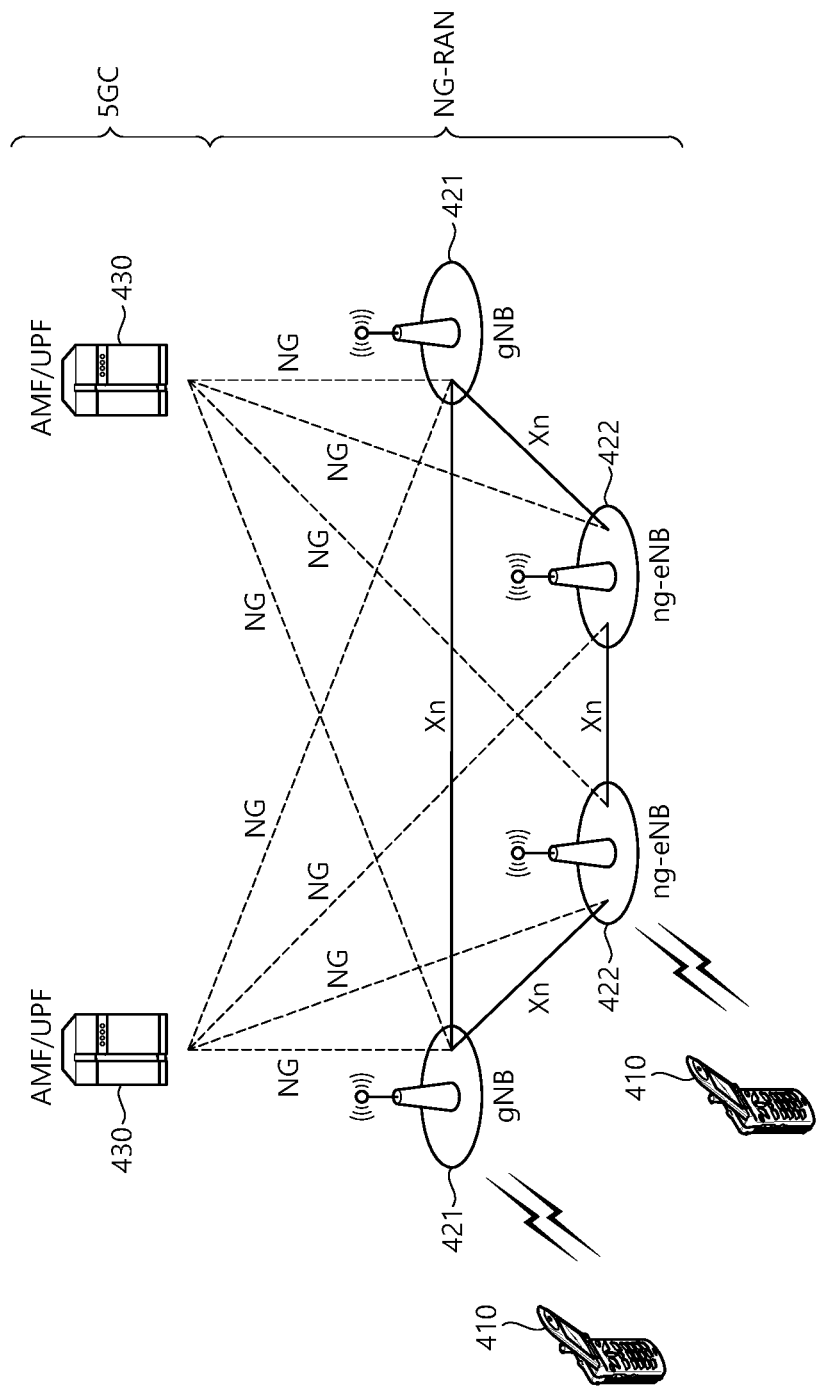
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
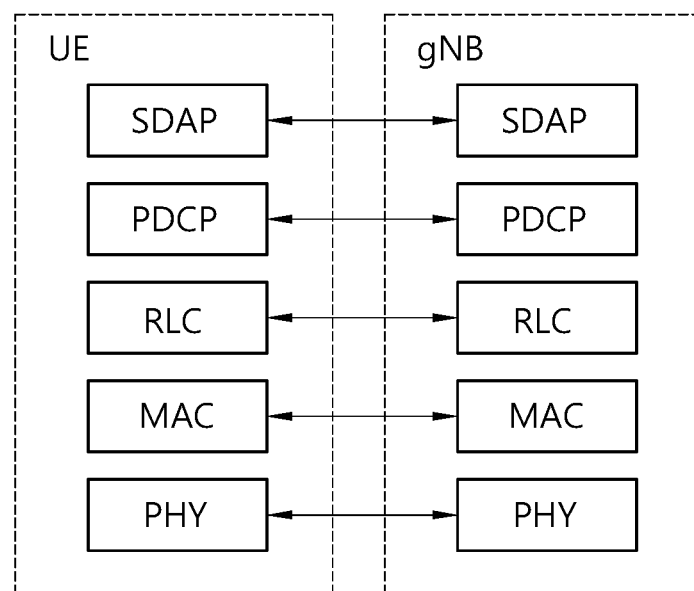
FIG. 5 shows a block diagram of a user plane protocol stack to which the technical features of the present disclosure can be applied.
Figure 6:
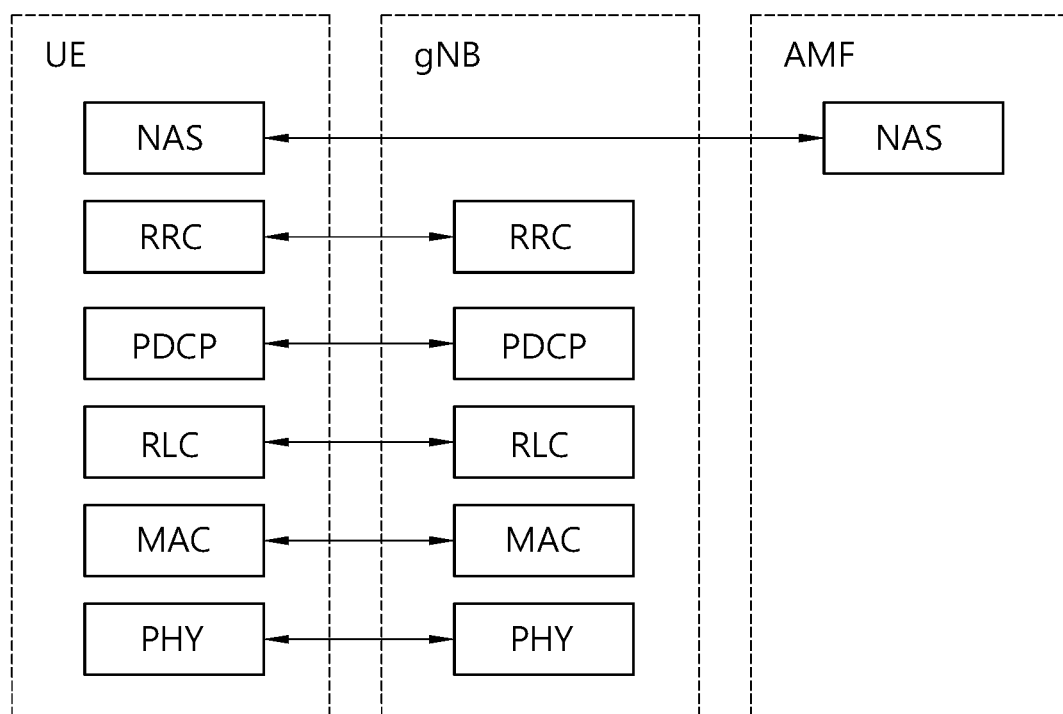
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
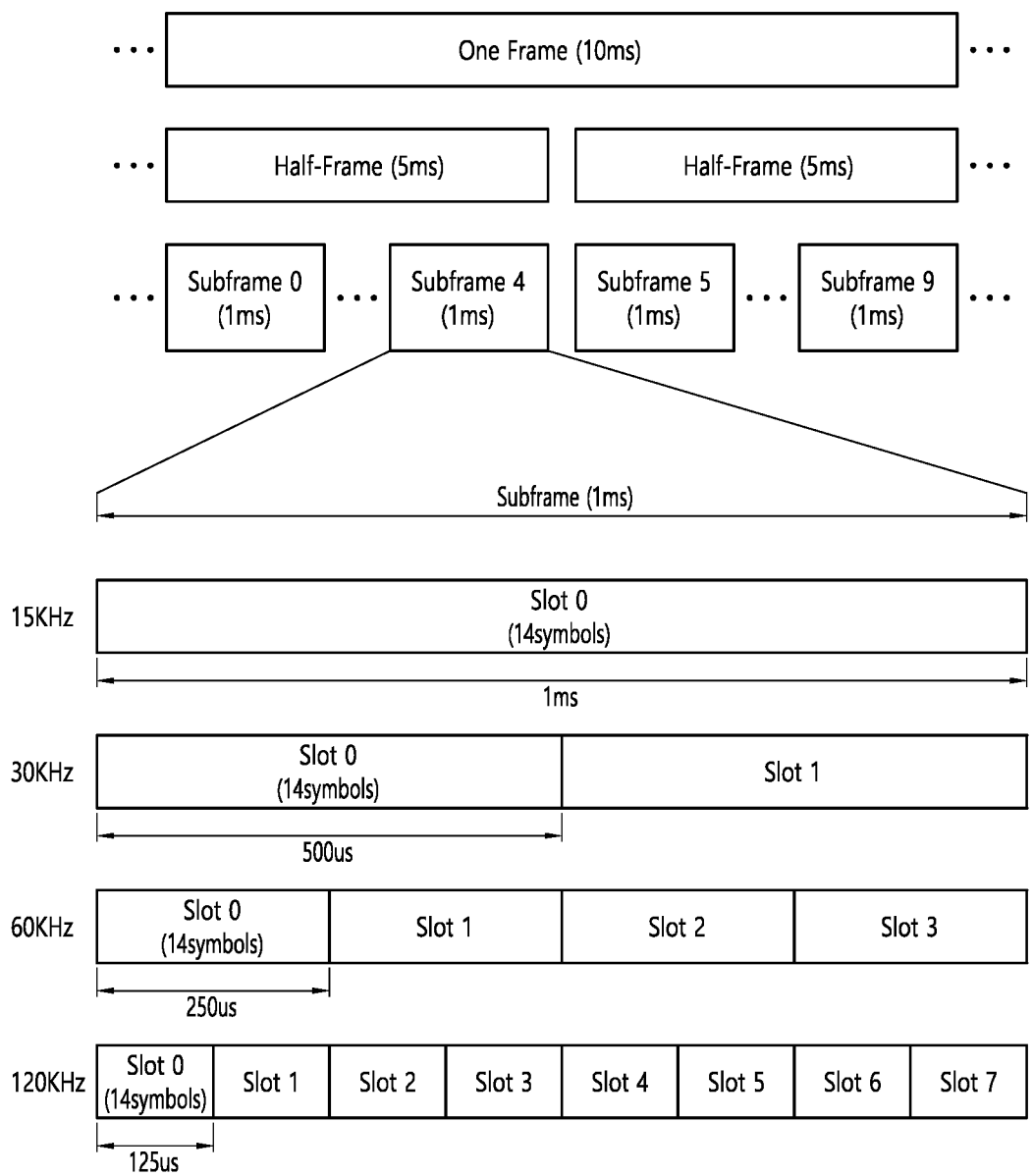
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2u*15$ kHz. The following table shows the number of OFDM symbols per slot, the number of slots per frame, and the number of slots per for the normal CP, according to the subcarrier spacing $\Delta f=2u*15$ kHz.

TABLE 3

| u | Nslotsymb | Nframe, uslot | Nsubframe,uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2u*15$ kHz.

TABLE 4

| u | Nslotsymb | Nframe, uslot | Nsubframe,uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
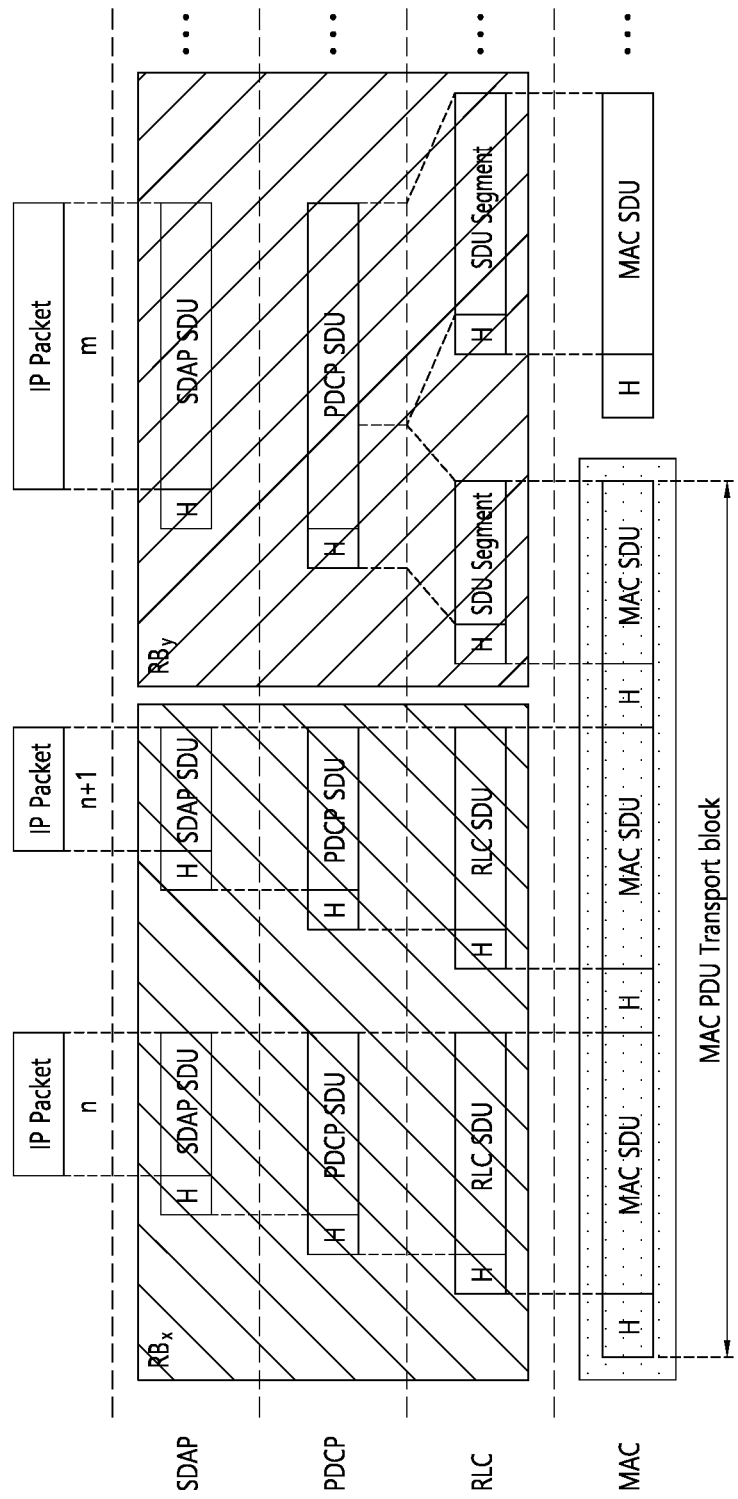
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
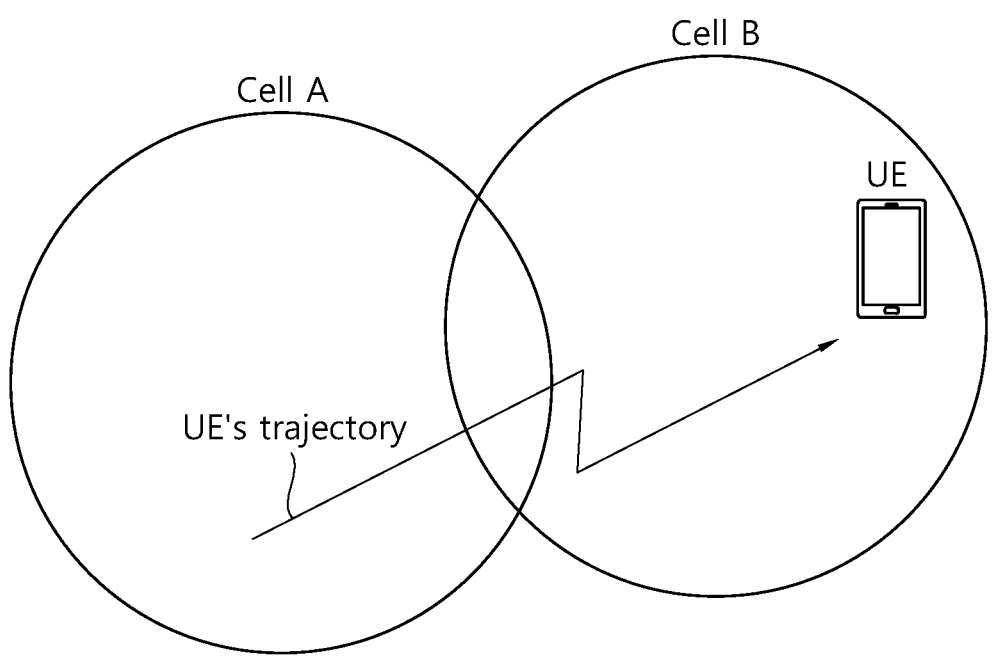
FIG. 9 shows an example of a cell selection and/or cell reselection situation to which technical features of the present disclosure can be applied.

FIG. 9 shows an example of a cell selection and/or cell reselection situation to which technical features of the present disclosure can be applied.

Referring to FIG. 9, a UE which may be currently served by cell A may move along a UE's trajectory as illustrated in FIG. 9 through the cell A and cell B. As the movement of the UE, signal quality for the cell A may become degraded and signal quality for the cell B may become improved. Therefore, the UE may perform a cell reselection to the cell B in order to be served by the cell B which may provide a better service to the UE than the cell A. The UE may perform a cell reselection and based on a result of the cell reselection (e.g., the number of cell reselections), a mobility state estimation (MSE) can be derived. The UE may determine a hysteresis value for cell reselection ranking criterion (i.e., Qhyst) and/or a cell reselection timer value (i.e., TreselectionRAT, TreselectionEUTRA, TreselectionNR) based on the MSE. Then, the UE may perform a next cell reselection to another cell based on the hysteresis value and/or the cell reselection timer value.

Hereinafter, cell selection process is described. Section 5.2.3 of 3GPP TS 38.304 V15.1.0 (2018-09) can be referred.

According to various embodiments, cell selection is performed by one of the following two procedures a) and b):
 a) Initial cell selection (no prior knowledge of which RF channels are NR frequencies):
  1. The UE shall scan all RF channels in the NR bands according to its capabilities to find a suitable cell.
  2. On each frequency, the UE need only search for the strongest cell.
  3. Once a suitable cell is found, this cell shall be selected.
 b) Cell selection by leveraging stored information:
  1. This procedure requires stored information of frequencies and optionally also information on cell parameters from previously received measurement control information elements or from previously detected cells.
  2. Once the UE has found a suitable cell, the UE shall select it.
  3. If no suitable cell is found, the initial cell selection procedure in a) shall be started.

Priorities between different frequencies or RATs provided to the UE by system information or dedicated signalling are not used in the cell selection process.

According to various embodiments, the cell selection criterion S is fulfilled when Srxlev>0 and Squal>0, where the Srxlev and Sqaul satisfies the following equation 1 and equation 2:

$$Srxlev = Q_{rxlevmeas} - (Q_{rxlevmin} + Q_{rxlevminoffset}) - P_{compensation} - Qoffset_{temp} \quad <\text{Equation 1}>$$

$$Squal = Q_{qualmeas} - (Q_{qualmin} + Q_{qualminoffset}) - Q_{offsettemp} \quad <\text{Equation 2}>$$

The definition of parameters related to equation 1 and equation 2 is illustrated as the below table 5:

TABLE 5

| | |
|---|---|
| Srxlev | Cell selection RX level value (dB) |
| Squal | Cell selection quality value (dB) |
| $Qoffset_{temp}$ | Offset temporarily applied to a cell as specified in 3GPP TS 38.331 (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN 3GPP TS 23.122. |
| $Q_{qualminoffset}$ | Offset to the signalled $Q_{qualmin}$ taken into account in the Squal evaluation as a result of a periodic search for a higher priority PLMN while camped normally in a VPLMN 3GPP TS 23.122. |
| $P_{compensation}$ | If the UE supports the additionalPmax in the NS-PmaxList, if present, in SIB1, SIB2 and SIB4:max($P_{EMAX1} - P_{PowerClass}$, 0) − (min($P_{EMAX2}, P_{PowerClass}$) − min($P_{EMAX1}, P_{PowerClass}$)) (dB);else:max($P_{EMAX1} - P_{PowerClass}$, 0) (dB) |
| $P_{EMAX1}$, $P_{EMAX2}$ | Maximum TX power level of a UE may use when transmitting on the uplink in the cell (dBm) defined as PEMAX in 3GPP TS 38.101. $P_{EMAX1}$ and $P_{EMAX2}$ are obtained from the p-Max and NS-PmaxList respectively in SIB1, SIB2 and SIB4 as specified in 3GPP TS 38.331. |
| $P_{PowerClass}$ | Maximum RF output power of the UE (dBm) according to the UE power class as defined in 3GPP TS 38.101. |

The signalled values $Q_{rxlevminoffset}$ and $Q_{qualminoffset}$ are only applied when a cell is evaluated for cell selection as a result of aperiodic search for a higher priority PLMN while camped normally in a VPLMN (3GPP TS 23.122). During this periodic search for higher priority PLMN, the LUE may check the S criteria of a cell using parameter values stored from a different cell of this higher priority PLMN. Hereinafter, mobility state estimation is described. Section 5.2.4.3 of 3GPP TS 38.304 V15.1.0 (2018-09) can be referred.

The UE mobility state is determined if the parameters ($T_{CRmax}$, $N_{CR\_H}$, $N_{CR\_M}$ and $T_{CRmaxHyst}$) are broadcasted in system information for the serving cell.

The mobility state criteria may be a normal-mobility state criteria, if number of cell reselections during time period $T_{CRmax}$ is less than $N_{CR\_M}$.

The mobility state criteria may be a medium-mobility sate criteria, if number of cell reselections during time period $T_{CRmax}$ is greater than or equal to $N_{CR\_M}$ but less than $N_{CR\_H}$.

The mobility state criteria may be a high-mobility state criteria, if number of cell reselections during time period $T_{CRmax}$ is greater than $N_{CR\_H}$.

The UE shall not consider consecutive reselections where a cell is reselected again right after one reselection for mobility state detection criteria.

The UE shall:
if the criteria for High-mobility state is detected, enter High-mobility state;
else if the criteria for Medium-mobility state is detected, enter Medium-mobility state;
else if criteria for either Medium- or High-mobility state is not detected during time period $T_{CRmaxHyst}$, enter Normal-mobility state.

If the UE is in High- or Medium-mobility state, the UE shall apply the speed dependent scaling rules.

UE shall apply the following scaling rules:
1) If neither Medium- nor High-mobility state is detected, no scaling is applied;
2) If High-mobility state is detected:
Add the sf-High of "Speed dependent ScalingFactor for $Q_{hyst}$" to Qhyst if broadcasted in system information;
For NR cells, multiply Treselection$_{NR}$ by the sf-High of "Speed dependent ScalingFactor for Treselection$_{NR}$" if broadcasted in system information;
For EUTRA cells, multiply Treselection$_{EUTRA}$ by the sf-High of "Speed dependent ScalingFactor for Treselection$_{EUTRA}$" if broadcasted in system information.
3) If Medium-mobility state is detected:
Add the sf-Medium of "Speed dependent ScalingFactor for $Q_{hyst}$" to Qhyst if broadcasted in system information;
For NR cells, multiply Treselection$_{NR}$ by the sf-Medium of "Speed dependent ScalingFactor for Treselection$_{NR}$" if broadcasted in system information;
For EUTRA cells, multiply Treselection$_{EUTRA}$ by the sf-Medium of "Speed dependent ScalingFactor for Treselection$_{EUTRA}$" if broadcasted in system information.

In case scaling is applied to any Treselection$_{RAT}$ parameter, the UE shall round up the result after all scalings to the nearest second.

Hereinafter, cell reselection criteria for NR Inter-frequency and inter-RAT cell is described. Section 5.2.4.5 of 3GPP TS 38.304 V15.1.0 (2018-09) can be referred.

If threshServingLowQ is broadcast in system information and more than 1 second has elapsed since the UE camped on the current serving cell, cell reselection to a cell on a higher priority NR frequency or inter-RAT frequency than the serving frequency shall be performed if:
A cell of a higher priority NR or EUTRAN RAT/frequency fulfils Squal>Thresh$_{X,HighQ}$ during a time interval Treselection$_{RAT}$ Otherwise, cell reselection to a cell on a higher priority NR frequency or inter-RAT frequency than the serving frequency shall be performed if:
A cell of a higher priority RAT/frequency fulfils Srxlev >Thresh$_{X,HighP}$ during a time interval Treselection$_{RAT}$; and
More than 1 second has elapsed since the UE camped on the current serving cell.

Cell reselection to a cell on an equal priority NR frequency shall be based on ranking for intra-frequency cell reselection.

If threshServingLowQ is broadcast in system information and more than 1 second has elapsed since the UE camped on the current serving cell, cell reselection to a cell on a lower priority NR frequency or inter-RAT frequency than the serving frequency shall be performed if:
The serving cell fulfils Squal<Thresh$_{serving, LowQ}$ and a cell of a lower priority NR or E-UTRAN RAT/frequency fulfils Squal>Thresh$_{X, LowQ}$ during a time interval Treselection$_{RAT}$.

Otherwise, cell reselection to a cell on a lower priority NR frequency or inter-RAT frequency than the serving frequency shall be performed if:
The serving cell fulfils Srxlev<Thresh$_{Serving, LowP}$ and a cell of a lower priority RAT/frequency fulfils Srxlev >Thresh$_{X, LowP}$ during a time interval Treselection$_{RAT}$; and
More than 1 second has elapsed since the UE camped on the current serving cell.

Cell reselection to a higher priority RAT/frequency shall take precedence over a lower priority RAT/frequency if multiple cells of different priorities fulfil the cell reselection criteria.

If more than one cell meets the above criteria, the UE shall reselect a cell as follows:
If the highest-priority frequency is an NR frequency, a cell ranked as the best cell among the cells on the highest priority frequency(ies) meeting the criteria;
If the highest-priority frequency is from another RAT, a cell ranked as the best cell among the cells on the highest priority frequency(ies) meeting the criteria of that RAT.

Hereinafter, cell reselection ranking criterion is described. Section 5.2.4.6 of 3GPP TS 38.304 V15.1.0 (2018-09) can be referred.

The cell-ranking criterion $R_s$ for serving cell and $R_n$ for neighbouring cells is defined by the following equation 3 and equation 4:

$$*182 R_s = Q_{meas,s} + Q_{hyst} - Q\text{offset}_{temp} \qquad \text{<Equation 3>}$$

$$R_n = Q_{meas,n} - Q\text{offset} - Q\text{offset}_{temp} \qquad \text{<Equation 4>}$$

The definition of parameters related to equation 3 and equation 4 is illustrated as the below table 6:

TABLE 6

| | |
|---|---|
| $Q_{meas}$ | RSRP measurement quantity used in cell reselections. |
| Qoffset | For intra-frequency: Equals to Qoffset$_{s,n}$, if Qoffset$_{s,n}$ is |

TABLE 6-continued

| | |
|---|---|
| | valid, otherwise this equals to zero. For inter-frequency: Equals to Qoffset$_{s,n}$ plus Qoffset$_{frequency}$, if Qoffset$_{s,n}$ is valid, otherwise this equals to Qoffset$_{frequency}$. |
| Qoffset$_{temp}$ | Offset temporarily applied to a cell as specified in 3GPP TS 38.331. |

The UE shall perform ranking of all cells that fulfil the cell selection criterion S. The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell. If this cell is found to be not-suitable, the UE shall behave according to subclause 5.2.4.4 of 3GPP TS38.304.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall behave according to subclause 5.2.4.4 of 3GPP TS38.304.

In all cases, the UE shall reselect the new cell, only if the following conditions are met:
  the new cell is better ranked than the serving cell during a time interval Treselection$_{RAT}$;
  more than 1 second has elapsed since the UE camped on the current serving cell.

Hereinafter, cell reselection parameters are described. Section 5.2.4.7 of 3GPP TS 38.304 V15.1.0 (2018-09) can be referred.

Cell reselection parameters are broadcast in system information and are read from the serving cell. The cell reselection parameters may comprise at least one of:
  absThreshSS-BlocksConsolidation, which may specify minimum threshold of the beam which can be used for selection of the highest ranked cell, if rangeToBestCell is configured;
  cellReselectionPriority, which may specify the absolute priority for NR frequency or E-UTRAN frequency;
  cellReselectionSubPriority, which may specify the fractional priority value added to cellReselectionPriority for NR frequency or E-UTRAN frequency;
  Qoffset$_{s,n}$, which may specify the offset between the two cells;
  Qoffset$_{frequency}$, which may specify Frequency specific offset for equal priority NR frequencies;
  $Q_{hyst}$, which may specify the hysteresis value for ranking criteria;
  Qoffset$_{temp}$, which may specify the additional offset to be used for cell selection and re-selection. It is temporarily used in case the RRC Connection Establishment fails on the cell as specified in 3GPP TS 38.331;
  $Q_{qualmin}$, which may specify the minimum required quality level in the cell in dB;
  $Qr_{xlevmin}$, which may specify the minimum required Rx level in the cell in dBm;
  $Q_{rxlevminoffsetcell}$, which may specify the cell specific Rx level offset in dB to Qrxlevmin;
  $Q_{qualminoffsetcell}$, which may specify the cell specific quality level offset in dB to Qqualmin;
  rangeToBestCell, which may specify the R value range which the cells whose R value is within the range can be a candidate for the highest ranked cell;
  Treselection$_{RAT}$, which may specify the cell reselection timer value. For each target NR frequency and for each RAT other than NR, a specific value for the cell reselection timer is defined, which is applicable when evaluating reselection within NR or towards other RAT (i.e. Treselection$_{RAT}$ for NR is Treselection$_{NR}$, for E-UTRAN Treselection$_{EUTRA}$). According to various embodiments, Treselection$_{RAT}$ may not be broadcast in system information but used in reselection rules by the UE for each RAT;
  Treselection$_{NR}$, which may specify the cell reselection timer value Treselection$_{RAT}$ for NR. The parameter can be set per NR frequency 3GPP TS 38.331;
  Treselection$_{EUTRA}$, which may specify the cell reselection timer value Treselection$_{RAT}$ for E-UTRAN;
  Thresh$_{X, HighP}$, which may specify the Srxlev threshold (in dB) used by the UE when reselecting towards a higher priority RAT/frequency than the current serving frequency. Each frequency of NR and E-UTRAN might have a specific threshold;
  Thresh$_{X, HighQ}$, which may specify the Squal threshold (in dB) used by the UE when reselecting towards a higher priority RAT/frequency than the current serving frequency. Each frequency of NR and E-UTRAN might have a specific threshold;
  Thresh$_{X, LowP}$, which may specify the Srxlev threshold (in dB) used by the UE when reselecting towards a lower priority RAT/frequency than the current serving frequency. Each frequency of NR and E-UTRAN might have a specific threshold;
  Thresh$_{X, LowQ}$, which may specify the Squal threshold (in dB) used by the UE when reselecting towards a lower priority RAT/frequency than the current serving frequency. Each frequency of NR and E-UTRAN might have a specific threshold;
  Thresh$_{Sering, LowP}$, which may specify the Srxlev threshold (in dB) used by the UE on the serving cell when reselecting towards a lower priority RAT/frequency;
  Thresh$_{Serving, LowQ}$, which may specify the Squal threshold (in dB) used by the UE on the serving cell when reselecting towards a lower priority RAT/frequency;
  $S_{IntraSearchP}$, which may specify the Srxlev threshold (in dB) for intra-frequency measurements;
  $S_{IntraSearchQ}$, which may specify the Squal threshold (in dB) for intra-frequency measurements;
  $S_{nonIntmSearchP}$, which may specify the Srxlev threshold (in dB) for NR inter-frequency and inter-RAT measurements; or
  $S_{nonIntrasearchQ}$, which may specify the Squal threshold (in dB) for NR inter-frequency and inter-RAT measurements.

According to various embodiments, the cell reselection parameters may further comprise speed dependent reselection parameters. The speed dependent reselection parameters are broadcast in system information and are read from the serving cell. The speed dependent parameter may comprise at least one of:
  $T_{CRmax}$, which may specify the duration for evaluating allowed amount of cell reselection(s);
  $N_{CR\_M}$, which may specify the maximum number of cell reselections to enter Medium-mobility state;
  $N_{CR\_H}$, which may specify the maximum number of cell reselections to enter High-mobility state;
  $T_{CRmaxHyst}$, which may specify the additional time period before the UE can enter Normal-mobility state;

Speed dependent ScalingFactor for $Q_{hyst}$, which may specify scaling factor for $Q_{hyst}$ in sf-High for High-mobility state and sf-Medium for Medium-mobility state;

Speed dependent ScalingFactor for $Treselection_{NR}$-, which may specify scaling factor for $Treselection_{NR}$ in sf-High for High-mobility state and sf-Medium for Medium-mobility state; or Speed dependent ScalingFactor for $Treselection_{EUTRA}$, which may specify scaling factor for $Treselection_{EuTRA}$ in sf-High for High-mobility state and sf-Medium for Medium-mobility state.

In a wireless communication system, a UE in RRC_IDLE or RRC_INACTIVE may perform cell reselection in order to camp on best cell. If the number of cell reselections during a specific time period (i.e., $T_{CRmax}$) is within a particular range, the UE may enter a medium/high-mobility state and adjust the cell reselection parameters (i.e. Treselection and Qhyst) in order to perform cell reselection quickly to neighbour cells. This may be an example of a MSE mechanism used in LTE and/or NR.

However, the MSE mechanism may not reflect the UE's real mobility accurately. As each cell may have different coverage size and each UE may pass different area of the cell (e.g., center of the cell coverage or boundary of the cell coverage), it may take different time for the UE to pass the cell. For example, it may take longer time for the UE to pass through a center of a cell coverage than to pass through a boundary of the cell coverage. It may take different time for the UE to pass each cell, but the time period for counting the recent number of cell reselections (i.e., $T_{CRmax}$) does not vary for each case. Therefore, in case of passing through the center of a cell, UE may take longer time to enter and then leave the cell, so the number of cell reselections may decrease before the UE enters the next cell. Decrease in the number of cell reselections may cause change of mobility state of the UE, so it would be bad for a cell reselection performance when the UE moves to the next neighbour cell.

Therefore, various embodiments of the present disclosure provides method and apparatus for the UE to scale a time period for determining the number of cell reselections (i.e., $T_{CRmax}$ value) based on a value of a serving cell quality (e.g., Srxlev). In detail, if the serving cell quality becomes better than a threshold, the UE may multiply the $T_{CRmax}$ value by a scaling factor, which may be greater than 1. Therefore, $T_{CRmax}$ value can be increased, and the increased $T_{CRmax}$ value may enable the UE to maintain the number of cell reselections longer until the UE leaves the current serving cell.

Figure 10:
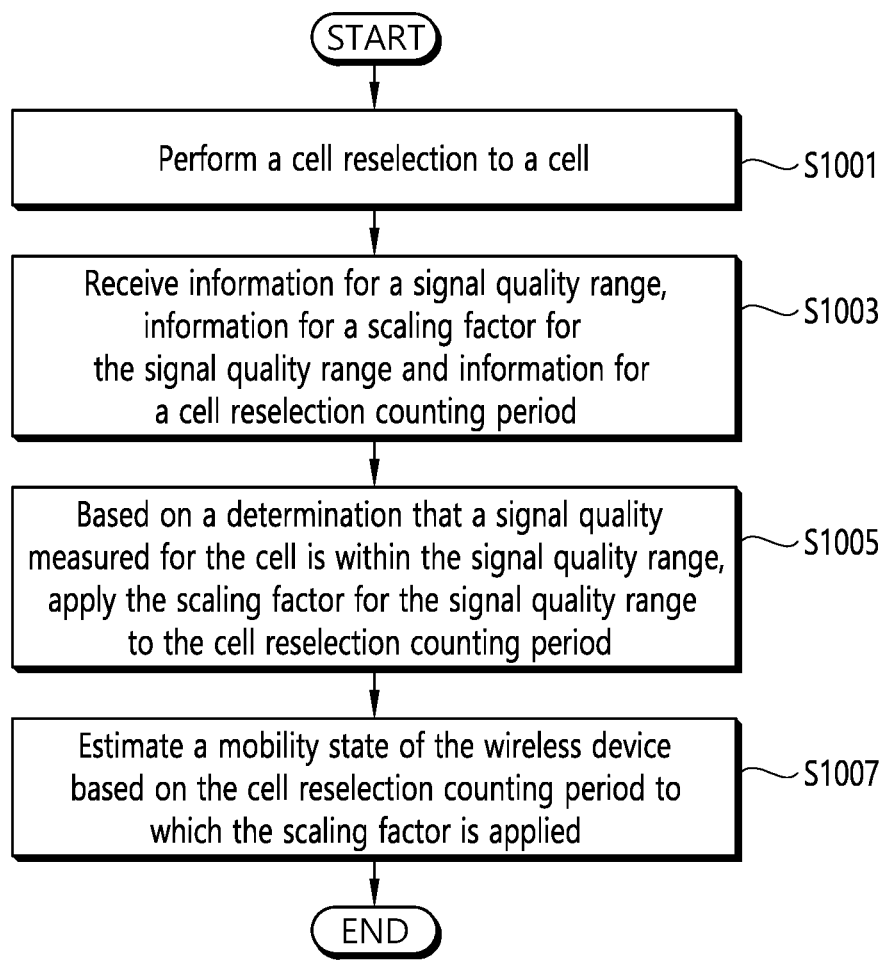
FIG. 10 shows an example of a method for scaling cell reselection counting period according to an embodiment of the present disclosure.

FIG. 10 shows an example of a method for scaling cell reselection counting period according to an embodiment of the present disclosure. The steps illustrated in FIG. 10 may be performed by a wireless device and/or a UE.

Referring to FIG. 10, in step S1001, the wireless device may perform a cell reselection to a cell. For example, if the wireless device found a neighbour cell having a better cell quality than the current serving cell as the wireless device moves along cells, the wireless device may perform a cell reselection to the neighbour cell.

In step S1003, the wireless device may receive information for a signal quality range, information for a scaling factor for the signal quality range and information for a cell reselection counting period. The wireless device may receive information for a signal quality range, information for a scaling factor for the signal quality range and information for a cell reselection counting period from the reselected cell or a RAN node related to the reselected cell.

In step S1005, the wireless device may, based on a determination that a signal quality (or, signal strength/cell quality/channel quality/Srxlev) measured for the cell is within the signal quality range, apply the scaling factor for the signal quality range to the cell reselection counting period. For example, the wireless device may measure the signal quality for the cell, and identify the signal quality range to which the measured signal quality belongs. The wireless device may identify the scaling factor for the identified signal quality range, and then apply the identified scaling factor to the cell reselection counting period.

In step S1007, the wireless device may estimate a mobility state of the wireless device based on the cell reselection counting period to which the scaling factor is applied. For example, the wireless device may determine the number of cell reselections during the cell reselection counting period to which the scaling factor is applied, and determine the mobility state of the wireless device based on the number of cell reselections.

According to various embodiments, the wireless device may, to apply the scaling factor to the cell reselection counting period, multiply the scaling factor with the cell reselection counting period. The scaling factor may be greater than 1. That is, the wireless device may multiply the scaling factor with the cell reselection counting period so as to increase the cell reselection counting period.

According to various embodiments, the wireless device may receive information for a plurality of signal quality ranges, and information for a plurality of scaling factors each of which is mapped to the plurality of signal quality ranges. The wireless device may identify, among the plurality of signal quality ranges, the signal quality range to which the signal quality for the cell belongs. The wireless device may identify, among the plurality of scaling factors, the scaling factor mapped to the identified signal quality range. The wireless device may apply the identified scaling factor to the cell reselection counting period.

According to various embodiments, the plurality of signal quality ranges may be mutually exclusive with each other. In other words, the plurality of signal quality ranges may not overlap with each other. Therefore, a lower bound of a signal quality range may be higher than an upper bound of the next lower signal quality range.

According to various embodiments, the plurality of signal quality ranges may comprise a first signal quality range, and the plurality of scaling factors may comprise a first scaling factor. The wireless device may have estimated the mobility state of the wireless device based on the cell reselection counting period to which the first scaling factor for the first signal quality range is applied. After estimating the mobility state of the wireless device, the wireless device may measure a signal quality for the cell again. The wireless device may identify, among the plurality of signal quality ranges, a second signal quality range to which the newly measured signal quality for the cell belongs. The wireless device may identify, among the plurality of scaling factors, a second scaling factor mapped to the second signal quality range. The wireless device may apply the second scaling factor to the cell reselection counting period to which the first scaling factor is not applied. That is, when the wireless device applies the second scaling factor after applying the first scaling factor to the cell reselection counting period, the wireless device may apply the second scaling factor to the original cell reselection counting period (i.e., cell reselection counting period to which not only the first scaling factor but also any of the plurality of scaling factors is not applied)

rather than to the cell reselection counting period to which the first scaling factor is applied.

According to various embodiments, the second signal quality range is higher than the first signal quality range, and the second scaling factor is higher than the first scaling factor. That is, the higher the signal quality range is, the higher the scaling factor mapped to the signal quality range is.

According to various embodiments, the wireless device may update the mobility state of the wireless device based on the cell reselection time period to which the second scaling factor is applied. That is, after determining the mobility state of the wireless device based on the cell reselection counting period to which the first scaling factor is applied, the wireless device may update the mobility state of the wireless device based on the cell reselection counting period to which the second scaling factor is applied.

According to various embodiments, the mobility state is determined to be a normal mobility state based on that the number of cell reselections is less that a first threshold. The mobility state is determined to be a medium mobility state based on that the number of cell reselections is greater than or equal to the first threshold and less than a second threshold. The mobility state is determined to be a high mobility state based on that the number of cell reselections is greater than or equal to the second threshold.

According to various embodiments, the wireless device may receive, from a base station related to the cell, information for the first threshold and information for the second threshold.

According to various embodiments, the scaling factor for the signal quality range is proportional to a cell coverage of the cell.

According to various embodiments, the wireless device may determine a hysteresis value for cell reselection ranking criterion and a cell reselection timer value based on the mobility state of the wireless device. The wireless device may perform a next cell reselection to another cell based on the hysteresis value and the cell reselection timer value.

Figure 11:
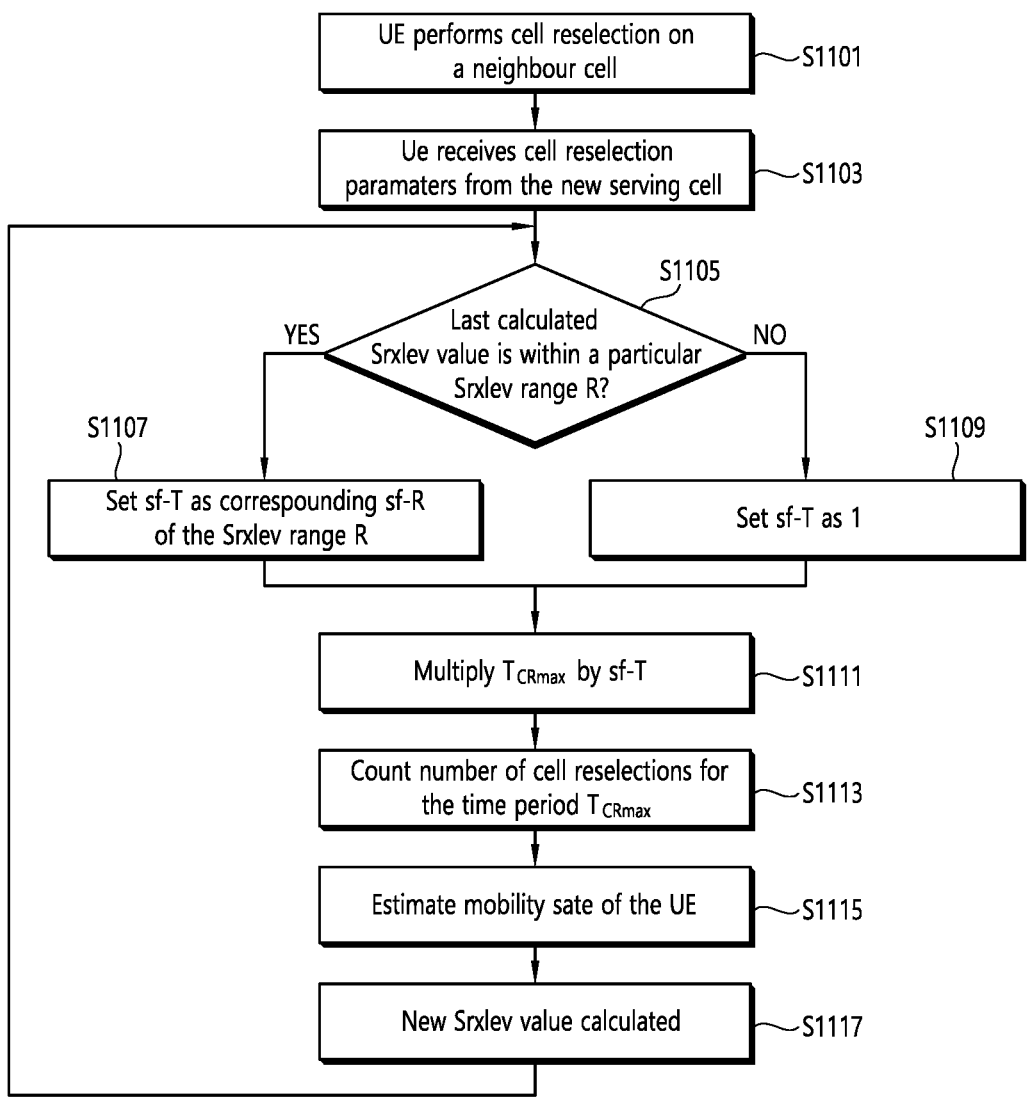
FIG. 11 shows another example for scaling a cell reselection counting period according to an embodiment of the present disclosure.

FIG. 11 shows another example for scaling a cell reselection counting period according to an embodiment of the present disclosure. The steps illustrated in FIG. 11 may be performed by a UE and/or a wireless device.

Referring to FIG. 11, in step S1101, the UE may perform a cell reselection to a neighbor cell. Then, the neighbor cell may now become a new serving cell for the UE.

In step S1103, the UE may receive cell reselection parameters from the new serving cell. If the UE is in RRC_IDLE or RRC_INACTIVE, the cell reselection parameters may be provided via broadcast system information (e.g., SIB2, 3, 4, 5, 6). Each cell in the network may broadcast different SIB. If the UE is in RRC_CONNECTED, and the cell reselection parameters can be provided via dedicated signalling. The cell reselection parameters may include at least one Srxlev range R, or at least one scaling factor sf-R. For the determination of a Srxlev range R, the network may provide lower bound offset and upper bound offset of the Srxlev range R. The scaling factor sf-R may be given positive real value (e.g., 1.5, 2, 3). The scaling factor sf-R may be mapped to Srxlev range R. Multiple Srxlev range Rs may be configured. Each Srxlev range R may be mapped to each scaling factor sf-R. For example, UE may receive Srxlev range R1 and scaling factor sf-R1 mapped to the Srxlev range R1 while the UE may receive Srxlev range R2 and scaling factor sf-R2 mapped to the Srxlev range R2. The value of sf-R1 and sf-R2 may be different. Srxlev range R does not overlap with each other (i.e., Srxlev range R may mutually exclusive with each other). So upper bound offset of Srxlev range R1 may be equal to or lower than the lower bound offset of another Srxlev range R2.

In step S1105, the UE may determine whether last calculated Srxlev (i.e., the Srxlev that is calculated latest) is within a particular Srxlev range R. While camping on a cell, a UE may continuously calculate the Srxlev value of the serving cell in order to estimate the channel quality of the serving cell. The Srxlev value may be calculated based on cell selection criterion described above.

In step S1107, if the Srxlev value is within a particular Srxlev range R, the UE may set sf-T value as sf-R value mapped to the particular Srxlev range R. On the other hand, in step S1109, if the Srxlev value does not belong to any of the received Srxlev range R, the UE may set the sf-T value as 1. Herein the sf-T value may be a scaling factor for $T_{CRmax}$.

In step S1111, the UE may multiply $T_{CRmax}$ (i.e., cell reselection counting period) by the sf-T.

In step S1113, the UE may count the recent number of cell reselections during time period $T_{CRmax}$.

In step S1115, the UE may estimate the mobility state of the UE. After the UE performs cell reselection to the neighbour cell, the UE may estimate the mobility state of the UE based on the cell reselection parameters provided by the new serving cell. The UE may determine its mobility state based on which number range the counted number of cell reselections is located in. Types of mobility states may comprise at least one of a normal-mobility state, a medium-mobility state, or high-mobility state. Each mobility state may be mapped to each number range. The number range may be determined by cell reselection parameters (e.g., NCR_M, NCR_H).

In step S1117, the UE may calculate new Srxlev value. When measured channel quality is updated, the UE may re-calculate the Srxlev value. If re-calculated Srxlev value is now within other Srxlev range R, the UE may now set sf-T value as sf-R value mapped to the new Srxlev range R. Then, the UE may determine whether last calculated Srxlev (i.e., the Srxlev that is calculated latest) is within a particular Srxlev range R in step S1105.

According to various embodiments, each cell may set value of sf-R mapped to each Srxlev range R. For example, if the cell expects itself that a coverage of the cell is larger than neighbor cells, the cell may increase the value of sf-R.

According to the various embodiments, the UE passing through near a cell may extend the $T_{CRmax}$ value so that the UE can maintain the counted number of cell reselections longer than before. Therefore, the UE may stay in the current mobility state until leaving the current cell and reselecting to another neighbour cell.

According to various embodiments, before step S1101, while in RRC_CONNECTED with connection towards a RAN node, the UE may perform RRC connection release procedure with the RAN node. The UE may receive an RRC release message from the RAN node. Upon receiving the RRC connection release message, the UE may enter RRC_IDLE and/or RRC_INACTIVE.

According to various embodiments, after step S1115 or after performing a cell reselection to a neighbour cell (therefore, the neighbour cell may become a new serving cell for the UE), the UE may establish/resume a connection with a RAN node related to the serving cell to enter RRC_CONNECTED again. The UE in RRC_IDLE may perform RRC connection establishment procedure with the RAN node. The UE may perform initial access towards the RAN node. The UE and the RAN node may perform RACH procedure. The UE may perform AS security activation upon receiving Security Mode Command from the RAN node. The UE in RRC_INACTIVE may perform RRC connection resume procedure with the RAN node. The UE may configure radio bearers and radio configuration upon receiving RRC reconfiguration message or resume radio bearers and radio configuration upon receiving RRC resume message.

Figure 12:
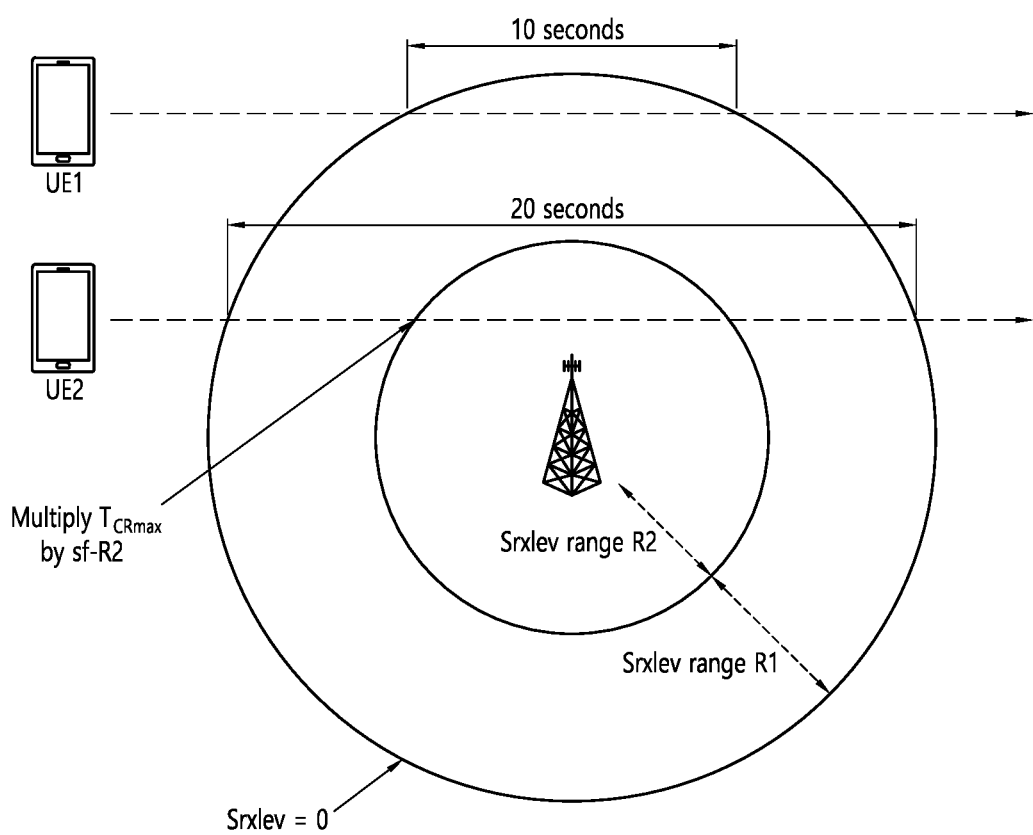
FIG. 12 shows an example of cases in which UE passes through a cell coverage according to an embodiment of the present disclosure.

FIG. 12 shows an example of cases in which UE passes through a cell coverage according to an embodiment of the present disclosure.

Referring to FIG. 12, UE1 and UE2 pass through a cell coverage. In FIG. 12, the followings are assumed:

Counted number of cell reselections before entering the cell: 3
UE1 takes 10 seconds to pass through the cell coverage.
UE2 takes 20 seconds to pass through the cell coverage.
Srxlev range R1: 0~6 (dB), sf-R1: 1
Srxlev range R2: 6~12 (dB) sf-R2: 2
TCRmax: 30 seconds When a UE is inside the coverage circle "Srxlev=0", the cell may be suitable for the UE. The UE1 is passing through boundary of the cell, while the UE2 is passing near the cell, so UE2 takes more time to pass through the cell coverage.

As time goes by while the UE1 and UE2 move inside the cell coverage, the counted number of cell reselections may decrease. UE1 passes through the cell coverage and moves on to the next neighbour cell in a short time (i.e. 10 seconds). However, the UE2 stays inside the cell coverage for a long time (i.e. 20 seconds). So the number of cell reselections may decrease for the case of UE2. If the UE2 was in high-mobility state, then the mobility state of the UE2 may fall down to medium-mobility state before entering the next neighbour cell, so that the UE2 cannot perform cell reselection quickly.

However, according to various embodiments, when the UE2 gets near the cell so that the Srxlev value may become higher than 6 (i.e., the Srxlev value enters Srxlev range R2), the $T_{CRmax}$ value is multiplied by sf-R2 value (i.e. 2), so the TCRmax value is doubled (60 seconds). As a result, after entering Srxlev range R2, the UE2 may count the past cell reselections up to 60 seconds so the UE2 may maintain the number of cell reselections longer than a case in which the $T_{CRmax}$ value is not scaled.

Figure 13:
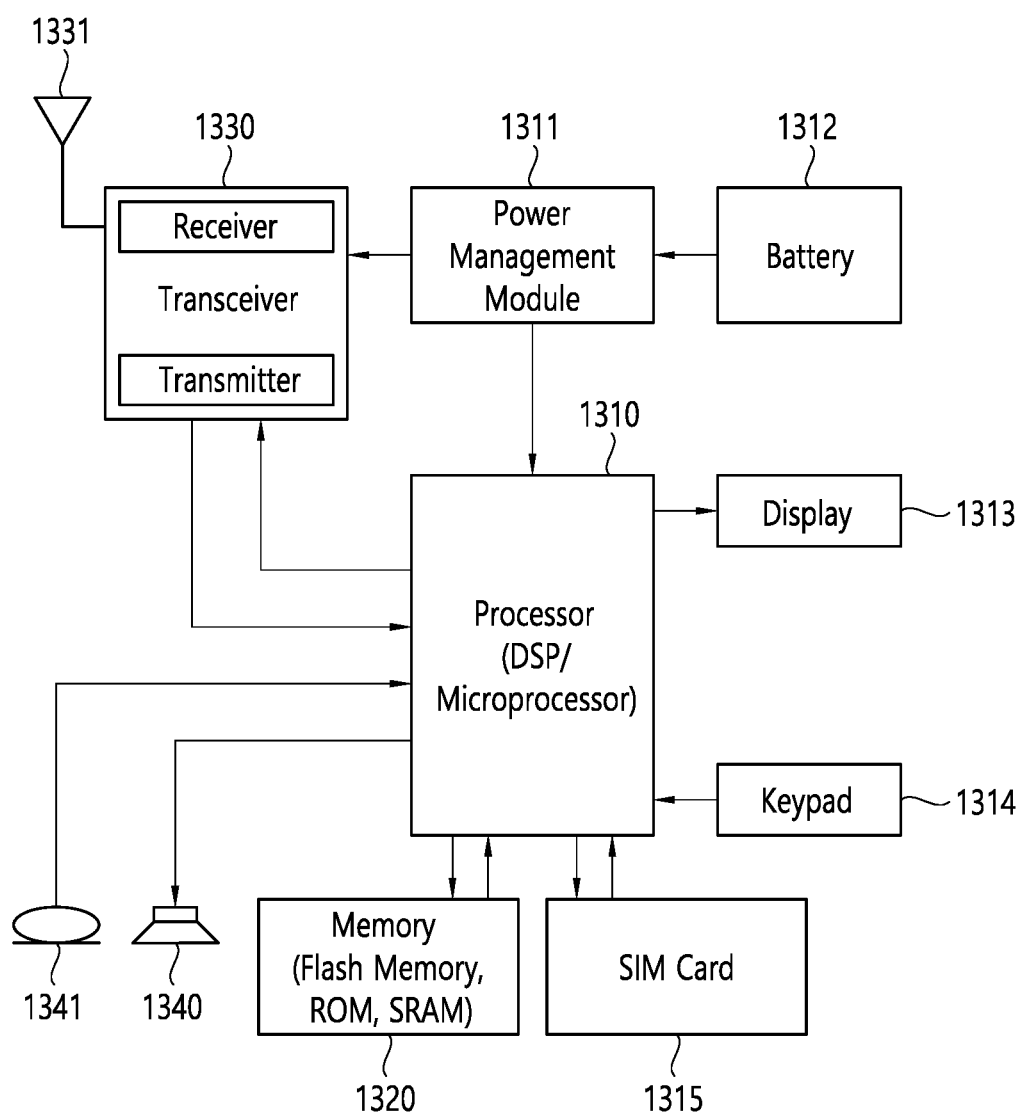
FIG. 13 shows a UE to implement an embodiment of the present disclosure.

FIG. 13 shows a UE to implement an embodiment of the present disclosure. The present disclosure described above for UE side may be applied to this embodiment.

A UE includes a processor 1310, a power management module 1311, a battery 1312, a display 1310, a keypad 1314, a subscriber identification module (SIM) card 1315, a memory 1320, a transceiver 1330, one or more antennas 1331, a speaker 1340, and a microphone 1341.

The processor 1310 may be configured to implement proposed functions, procedures and/or methods described in this description. Layers of the radio interface protocol may be implemented in the processor 1310. The processor 1310 may include application-specific integrated circuit (ASIC), other chipset, logic circuit and/or data processing device. The processor 1310 may be an application processor (AP). The processor 1310 may include at least one of a digital signal processor (DSP), a central processing unit (CPU), a graphics processing unit (GPU), a modem (modulator and demodulator). An example of the processor 1310 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1310 may be configured to, or configured to control the transceiver 1330 to implement steps performed by the UE and/or the wireless device throughout the disclosure.

The power management module 1311 manages power for the processor 1310 and/or the transceiver 1330. The battery 1312 supplies power to the power management module 1311. The display 1310 outputs results processed by the processor 1310. The keypad 1314 receives inputs to be used by the processor 1310. The keypad 1314 may be shown on the display 1310. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1310 and stores a variety of information to operate the processor 1310. The memory 1320 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1310. The memory 1320 can be implemented within the processor 1310 or external to the processor 1310 in which case those can be communicatively coupled to the processor 1310 via various means as is known in the art.

The transceiver 1330 is operatively coupled with the processor 1310, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1310. The microphone 1341 receives sound-related inputs to be used by the processor 1310.

Figure 14:
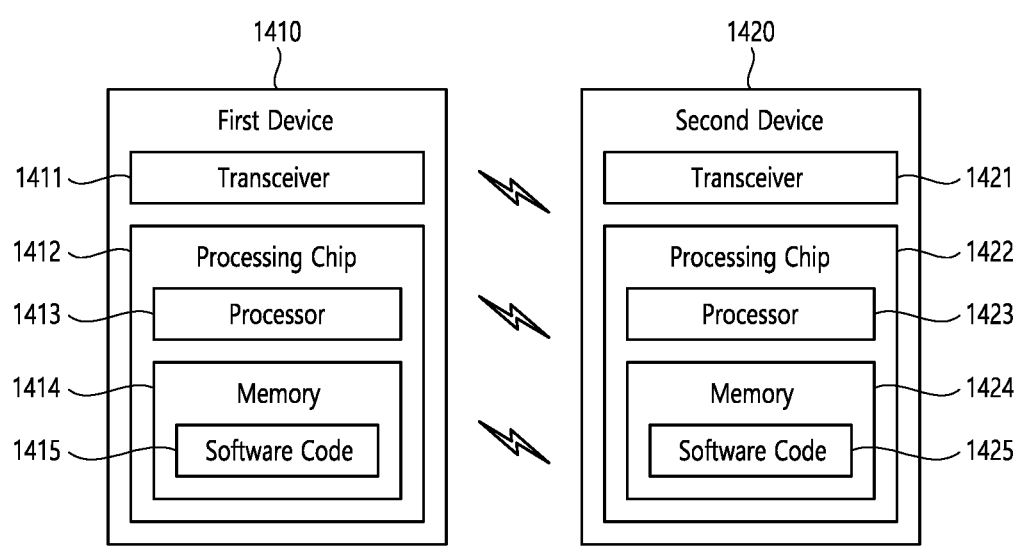
FIG. 14 shows another example of a wireless communication system to which the technical features of the present disclosure can be applied.

FIG. 14 shows another example of a wireless communication system to which the technical features of the present disclosure can be applied.

Referring to FIG. 14, the wireless communication system may include a first device 1410 (i.e., first device 210) and a second device 1420 (i.e., second device 220).

The first device 1410 may include at least one transceiver, such as a transceiver 1411, and at least one processing chip, such as a processing chip 1412. The processing chip 1412 may include at least one processor, such a processor 1413, and at least one memory, such as a memory 1414. The memory may be operably connectable to the processor 1413. The memory 1414 may store various types of information and/or instructions. The memory 1414 may store a software code 1415 which implements instructions that, when executed by the processor 1413, perform operations of the first device 910 described throughout the disclosure. For example, the software code 1415 may implement instructions that, when executed by the processor 1413, perform the functions, procedures, and/or methods of the first device 1410 described throughout the disclosure. For example, the software code 1415 may control the processor 1413 to perform one or more protocols. For example, the software code 1415 may control the processor 1413 to perform one or more layers of the radio interface protocol.

The second device 1420 may include at least one transceiver, such as a transceiver 1421, and at least one processing chip, such as a processing chip 1422. The processing chip 1422 may include at least one processor, such a processor 1423, and at least one memory, such as a memory 1424. The memory may be operably connectable to the processor 1423. The memory 1424 may store various types of information and/or instructions. The memory 1424 may store a software code 1425 which implements instructions that, when executed by the processor 1423, perform operations of the second device 1420 described throughout the disclosure. For example, the software code 1425 may implement instructions that, when executed by the processor 1423, perform the functions, procedures, and/or methods of the second device 1420 described throughout the disclosure. For example, the software code 1425 may control the processor 1423 to perform one or more protocols. For example, the software code 1425 may control the processor 1423 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 15:
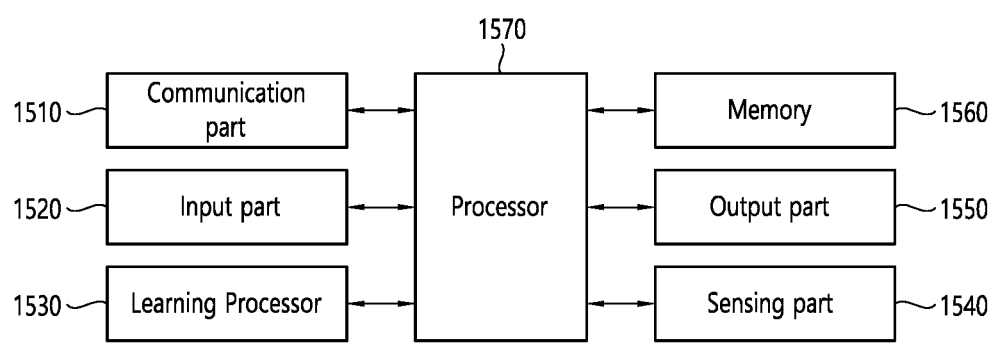
FIG. 15 shows an example of an AI device to which the technical features of the present disclosure can be applied.

FIG. 15 shows an example of an AI device to which the technical features of the present disclosure can be applied.

The AI device 1500 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 15, the AI device 1500 may include a communication part 1510, an input part 1520, a learning processor 1530, a sensing part 1540, an output part 1550, a memory 1560, and a processor 1570.

The communication part 1510 can transmit and/or receive data to and/or from external devices such as the AI devices and the AI server using wire and/or wireless communication technology. For example, the communication part 1510 can transmit and/or receive sensor information, a user input, a learning model, and a control signal with external devices. The communication technology used by the communication part 1510 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1520 can acquire various kinds of data. The input part 1520 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1520 can acquire input data to be used when acquiring an output using learning data and a learning model for model learning. The input part 1520 may obtain raw input data, in which case the processor 1570 or the learning processor 1530 may extract input features by preprocessing the input data.

The learning processor 1530 may learn a model composed of an ANN using learning data. The learned ANN can be referred to as a learning model. The learning model can be used to infer result values for new input data rather than learning data, and the inferred values can be used as a basis for determining which actions to perform. The learning processor 1530 may perform AI processing together with the learning processor of the AI server. The learning processor 1530 may include a memory integrated and/or implemented in the AI device 1500. Alternatively, the learning processor 1530 may be implemented using the memory 1560, an external memory directly coupled to the AI device 1500, and/or a memory maintained in an external device.

The sensing part 1540 may acquire at least one of internal information of the AI device 1500, environment information of the AI device 1500, and/or the user information using various sensors. The sensors included in the sensing part 1540 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1550 may generate an output related to visual, auditory, tactile, etc. The output part 1550 may include a display unit for outputting visual information, a speaker for outputting auditory information, and/or a haptic module for outputting tactile information.

The memory 1560 may store data that supports various functions of the AI device 1500. For example, the memory 1560 may store input data acquired by the input part 1520, learning data, a learning model, a learning history, etc.

The processor 1570 may determine at least one executable operation of the AI device 1500 based on information determined and/or generated using a data analysis algorithm and/or a machine learning algorithm. The processor 1570 may then control the components of the AI device 1500 to perform the determined operation. The processor 1570 may request, retrieve, receive, and/or utilize data in the learning processor 1530 and/or the memory 1560, and may control the components of the AI device 1500 to execute the predicted operation and/or the operation determined to be desirable among the at least one executable operation. The processor 1570 may generate a control signal for controlling the external device, and may transmit the generated control signal to the external device, when the external device needs to be linked to perform the determined operation. The processor 1570 may obtain the intention information for the user input and determine the user's requirements based on the obtained intention information. The processor 1570 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1530 and/or learned by the learning processor of the AI server, and/or learned by their distributed processing. The processor 1570 may collect history information including the operation contents of the AI device 1500 and/or the user's feedback on the operation, etc. The processor 1570 may store the collected history information in the memory 1560 and/or the learning processor 1530, and/or transmit to an external device such as the AI server. The collected history information can be used to update the learning model. The processor 1570 may control at least some of the components of AI device 1500 to drive an application program stored in memory 1560. Furthermore, the processor 1570 may operate two or more of the components included in the AI device 1500 in combination with each other for driving the application program.

Figure 16:
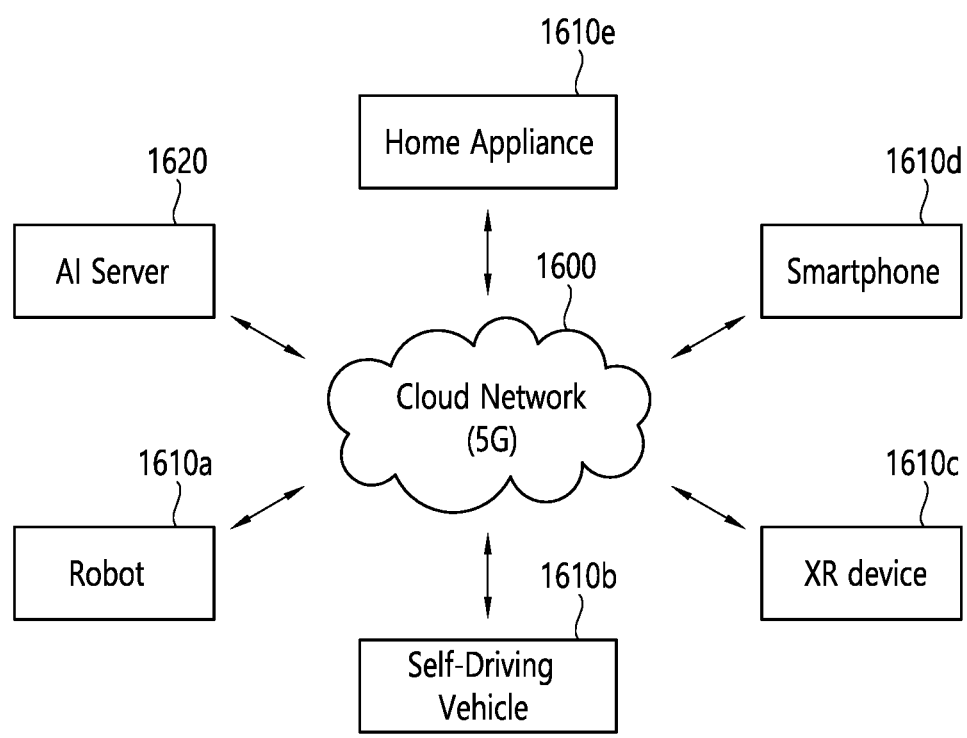
FIG. 16 shows an example of an AI system to which the technical features of the present disclosure can be applied.

FIG. 16 shows an example of an AI system to which the technical features of the present disclosure can be applied.

Referring to FIG. 16, in the AI system, at least one of an AI server 1620, a robot 1610a, an autonomous vehicle 1610b, an XR device 1610c, a smartphone 1610d and/or a home appliance 1610e is connected to a cloud network 1600. The robot 1610a, the autonomous vehicle 1610b, the XR device 1610c, the smartphone 1610d, and/or the home appliance 1610e to which the AI technology is applied may be referred to as AI devices 1610a to 1610e.

The cloud network 1600 may refer to a network that forms part of a cloud computing infrastructure and/or resides in a cloud computing infrastructure. The cloud network 1600 may be configured using a 3G network, a 4G or LTE network, and/or a 5G network. That is, each of the devices 1610a to 1610e and 1620 consisting the AI system may be connected to each other through the cloud network 1600. In particular, each of the devices 1610a to 1610e and 1620 may communicate with each other through a base station, but may directly communicate with each other without using a base station.

The AI server 1620 may include a server for performing AI processing and a server for performing operations on big data. The AI server 1620 is connected to at least one or more of AI devices constituting the AI system, i.e. the robot 1610a, the autonomous vehicle 1610b, the XR device 1610c, the smartphone 1610d and/or the home appliance 1610e through the cloud network 1600, and may assist at least some AI processing of the connected AI devices 1610a to 1610e. The AI server 1620 can learn the ANN according to the machine learning algorithm on behalf of the AI devices 1610a to 1610e, and can directly store the learning models and/or transmit them to the AI devices 1610a to 1610e. The AI server 1620 may receive the input data from the AI devices 1610a to 1610e, infer the result value with respect to the received input data using the learning model, generate a response and/or a control command based on the inferred result value, and transmit the generated data to the AI devices 1610a to 1610e. Alternatively, the AI devices 1610a to 1610e may directly infer a result value for the input data using a learning model, and generate a response and/or a control command based on the inferred result value.

Various embodiments of the AI devices 1610a to 1610e to which the technical features of the present disclosure can be applied will be described. The AI devices 1610a to 1610e shown in FIG. 16 can be seen as specific embodiments of the AI device 1500 shown in FIG. 15.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The present disclosure can have various advantageous effects.

For example, by extending a cell reselection counting period based on whether a wireless device passes through a center of a cell coverage or a boundary of the cell coverage (or, based on a channel quality for the cell), the wireless device can maintain the number of cell reselections counted for MSE longer and thus can stay in an appropriate mobility state. Therefore, better cell reselection performance can be expected for the wireless device based on the appropriate mobility state which may correspond to an actual mobility behavior (e.g., speed) of the wireless device.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
 performing a cell reselection to a cell;
 receiving information for a plurality of signal quality ranges, information for a plurality of scaling factors each of which is mapped to the plurality of signal quality ranges and information for a time period for determining a number of cell reselections;
 measuring a first signal quality for the cell;
 identifying, among the plurality of signal quality ranges, a first signal quality range to which the first signal quality belongs;
 identifying, among the plurality of scaling factors, a first scaling factor mapped to the identified first signal quality range;
 applying the first scaling factor for the first signal quality range to the time period;
 estimating a mobility state of the wireless device based on the time period to which the first scaling factor is applied; and
 after estimating the mobility state of the wireless device:
 measuring a second signal quality for the cell;
 identifying, among the plurality of signal quality ranges, a second signal quality range to which the second signal quality belongs;
 identifying, among the plurality of scaling factors, a second scaling factor mapped to the second signal quality range; and
 applying the second scaling factor to the time period to which the first scaling factor is not applied,
 wherein the mobility state of the wireless device is determined based on the number of cell reselections,
 wherein the mobility state is determined to be a normal mobility state based on the number of cell reselections being less that a first threshold,
 wherein the mobility state is determined to be a medium mobility state based on the number of cell reselections being greater than or equal to the first threshold and less than a second threshold,
 wherein the mobility state is determined to be a high mobility state based on the number of cell reselections being greater than or equal to the second threshold,
 wherein information for the first threshold and information for the second threshold are received from a base station related to the cell, and
 wherein a hysteresis value and a cell reselection timer value for cell reselection ranking criterion are determined based on the mobility state of the wireless device.

2. The method of claim 1, wherein the applying of the first scaling factor to the time period comprises multiplying the first scaling factor with the time period, and
 wherein the first scaling factor is greater than 1.

3. The method of claim 1, wherein the plurality of signal quality ranges are mutually exclusive with each other.

4. The method of claim 1, wherein the second signal quality range is higher than the first signal quality range, and
 wherein the second scaling factor is higher than the first scaling factor.

5. The method of claim 1, further comprising:
 updating the mobility state of the wireless device based on the time period to which the second scaling factor is applied.

6. The method of claim 1, wherein the first scaling factor for the first signal quality range is proportional to a cell coverage of the cell.

7. The method of claim 1, wherein the wireless device is in communication with at least one of a user equipment, a network, or autonomous vehicles other than the wireless device.

8. A wireless device in a wireless communication system comprising:
 a transceiver;
 a memory; and
 at least one processor operatively coupled to the transceiver and the memory,
 wherein the memory stores instructions that, based on being executed by the at least one processor, perform operations comprising:
 performing a cell reselection to a cell;
 receiving information for a plurality of signal quality ranges, information for a plurality of scaling factors each of which is mapped to the plurality of signal quality ranges, and information for a time period for determining a number of cell reselections;
 measuring a first signal quality for the cell;
 identifying, among the plurality of signal quality ranges a first signal quality range to which the first signal quality belongs;
 identifying, among the plurality of scaling factors, a first scaling factor mapped to the identified first signal quality range;
 applying the first scaling factor for the first signal quality range to the time period;
 estimating a mobility state of the wireless device based on the time period to which the first scaling factor is applied; and
 after estimating the mobility state of the wireless device:
 measuring a second signal quality for the cell;
 identifying, among the plurality of signal quality ranges, a second signal quality range to which the second signal quality belongs;
 identifying, among the plurality of scaling factors, a second scaling factor mapped to the second signal quality range; and
 applying the second scaling factor to the time period to which the first scaling factor is not applied,
 wherein the mobility state of the wireless device is determined based on the number of cell reselections,
 wherein the mobility state is determined to be a normal mobility state based on the number of cell reselections being less that a first threshold,
 wherein the mobility state is determined to be a medium mobility state based on the number of cell reselections being greater than or equal to the first threshold and less than a second threshold,
 wherein the mobility state is determined to be a high mobility state based on the number of cell reselections being greater than or equal to the second threshold, wherein information for the first threshold and information for the second threshold are received from a base station related to the cell, and wherein a hysteresis value and a cell reselection timer value for cell reselection ranking criterion are determined based on the mobility state of the wireless device.

9. A non-transitory computer-readable medium having recorded thereon a program for performing a method performed by a wireless device on a computer, the method comprising:

performing a cell reselection to a cell;

receiving information for a plurality of signal quality ranges, information for a plurality of scaling factors each of which is mapped to the plurality of signal quality ranges, and information for a time period for determining a number of cell reselections;

measuring a first signal quality for the cell;

identifying, among the plurality of signal quality ranges, a first signal quality range to which the first signal quality belongs;

identifying, among the plurality of scaling factors, a first scaling factor mapped to the identified first signal quality range;

applying the first scaling factor for the first signal quality range to the time period;

estimating a mobility state of the wireless device based on the time period to which the first scaling factor is applied; and after estimating the mobility state of the wireless device:

measuring a second signal quality for the cell;

identifying, among the plurality of signal quality ranges, a second signal quality range to which the second signal quality belongs;

identifying, among the plurality of scaling factors, a second scaling factor mapped to the second signal quality range; and applying the second scaling factor to the time period to which the first scaling factor is not applied, wherein the mobility state of the wireless device is determined based on the number of cell reselections, wherein the mobility state is determined to be a normal mobility state based on the number of cell reselections being less that a first threshold, wherein the mobility state is determined to be a medium mobility state based on the number of cell reselections being greater than or equal to the first threshold and less than a second threshold, wherein the mobility state is determined to be a high mobility state based on the number of cell reselections being greater than or equal to the second threshold, wherein information for the first threshold and information for the second threshold are received from a base station related to the cell, and wherein a hysteresis value and a cell reselection timer value for cell reselection ranking criterion are determined based on the mobility state of the wireless device.

* * * * *